July 14, 1953  T. R. SMITH  2,645,318
TRANSMISSION DRIVE MECHANISM
Original Filed Dec. 20, 1948  4 Sheets-Sheet 2
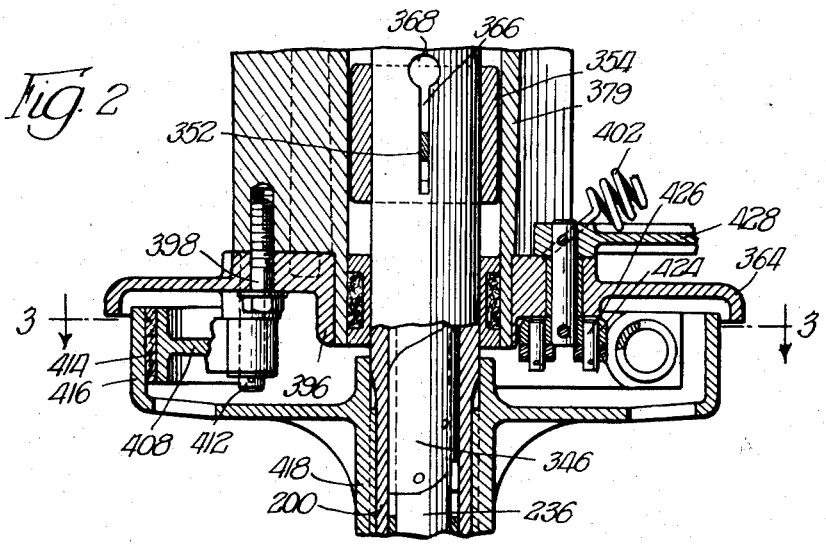
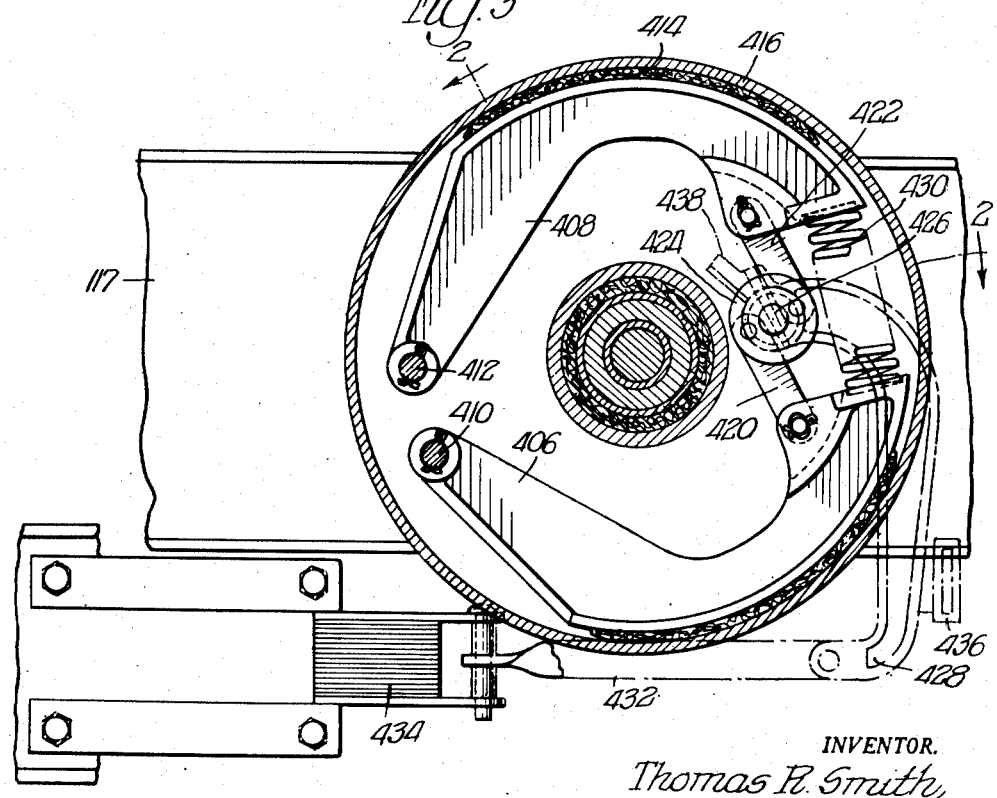
INVENTOR.
Thomas R. Smith,
By Wilkinson, Huxley,
Byron & Hume
Attys July 14, 1953 T. R. SMITH 2,645,318
TRANSMISSION DRIVE MECHANISM
Original Filed Dec. 20, 1948 4 Sheets-Sheet 3

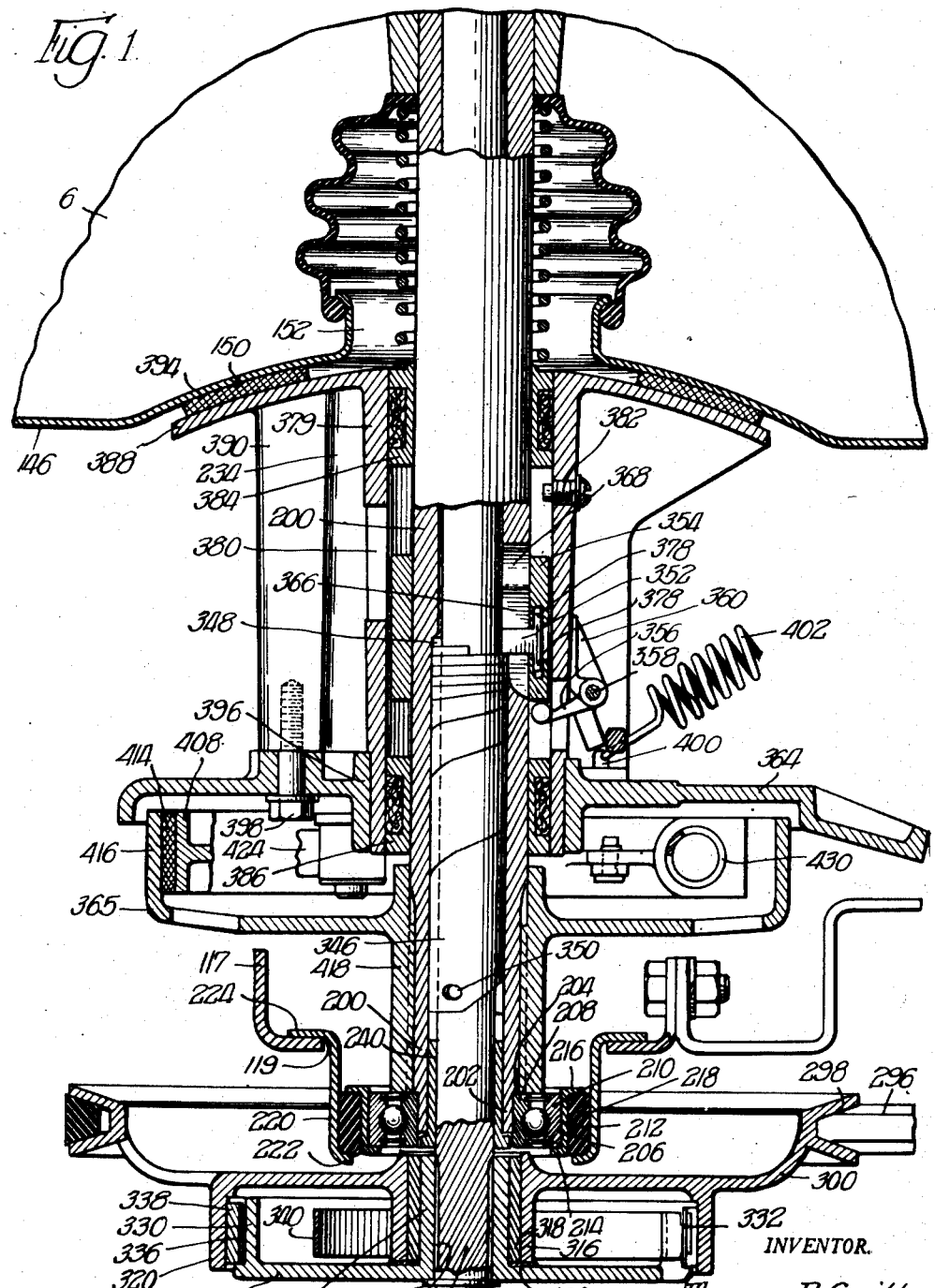

INVENTOR.
Thomas R. Smith,
By Wilkinson, Huxley,
Byron + Knuth
Attys.

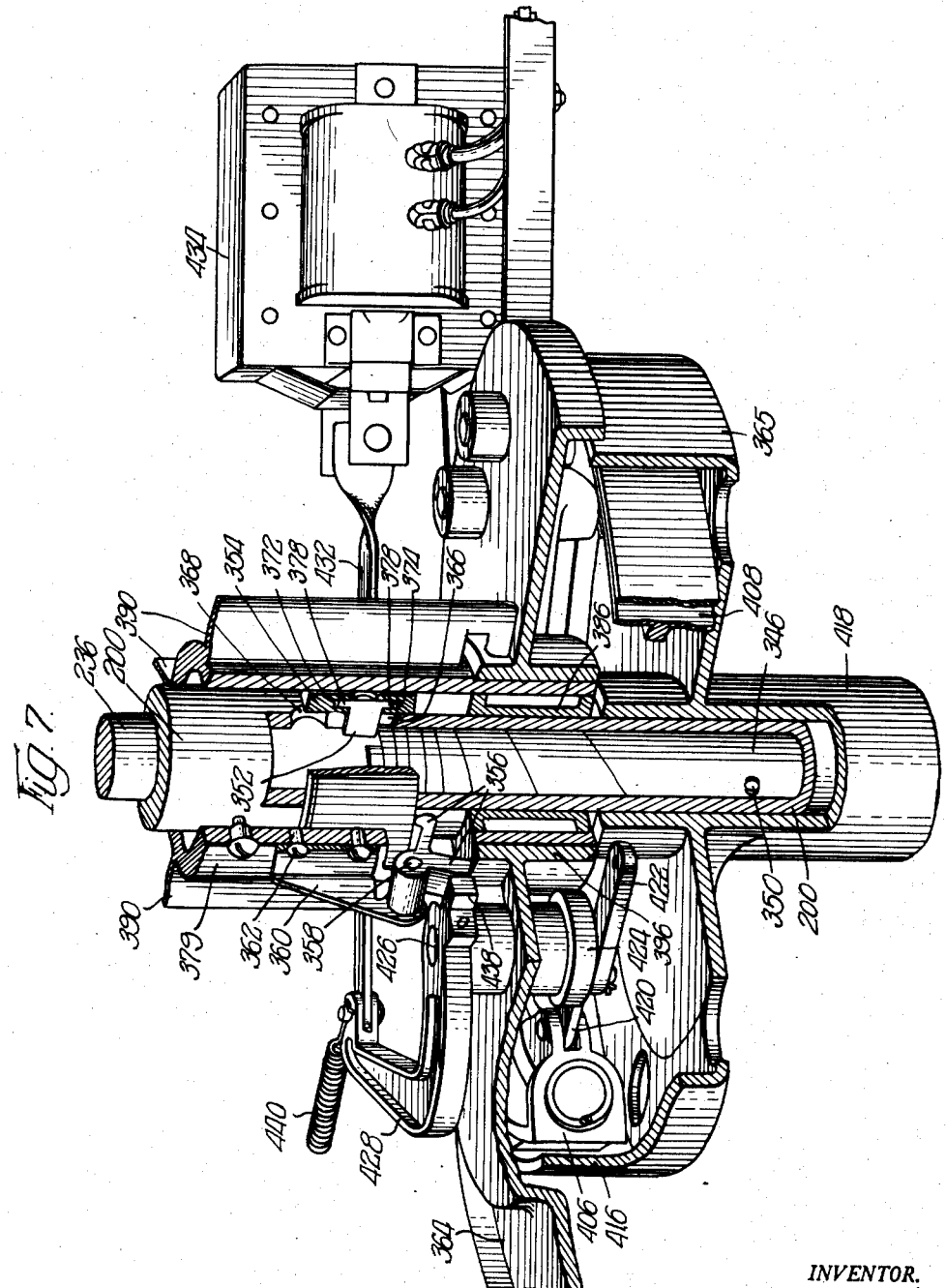

Patented July 14, 1953

2,645,318

UNITED STATES PATENT OFFICE 2,645,318

TRANSMISSION DRIVE MECHANISM

Thomas R. Smith, Newton, Iowa, assignor to The Maytag Company, Newton, Iowa, a corporation of Delaware Original application December 20, 1948, Serial No. 66,230. Divided and this application November 17, 1950, Serial No. 196,291. In Canada December 1, 1949

6 Claims. (Cl. 192—41)

This invention relates to transmission drive mechanism. The present application is a division of the parent application Serial No. 66,230, filed December 20, 1948. In the parent application the transmission drive mechanism including clutch mechanism is disclosed and claimed in connection with a washing machine but its use extends generally to shafts which are adapted to be operatively connected and disconnected in power transmission mechanism.

One object of the invention is to provide a simple, durable and efficient transmission drive mechanism wherein the relatively few parts cooperate in a simple and effective manner and may be readily assembled and disassembled.

Another object is to provide novel clutch mechanism wherein inner and outer shafts may be connected and disconnected in a manner to meet all the requirements for successful operation.

These and other objects are accomplished by the mechanism shown in the accompanying drawings in which Figure 1 is an enlarged fragmentary vertical cross-sectional view of driving mechanism of a washing machine including my improved clutch mechanism;

Figure 2 is a view similar to Figure 1 taken in planes represented by lines 2—2 in 3;

Figure 3 is a horizontal cross-sectional view taken in the plane represented by line 3—3 of Figure 2;

Figure 7 is a partial sectional perspective view of the improved brake and clutch mechanisms.

Figure 4:
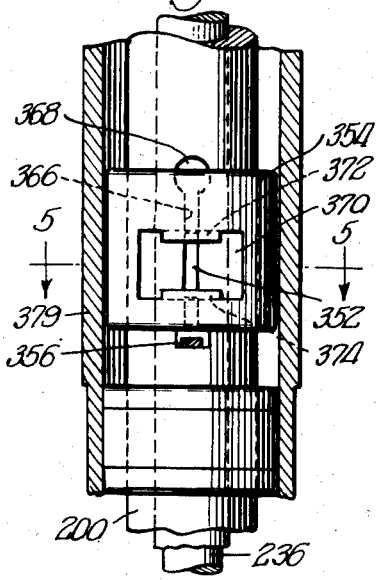
Figure 4 is an enlarged vertical cross-sectional view of the control means for the clutch for the driving mechanism shown in Figures 1 and 2 of the drawings.

Referring particularly to the drawings, it will be seen that my improved clutch mechanism is illustrated in connection with but not limited to a washing machine having an outer stationary tub 6 the central portion of the bottom wall 146 of which is formed with a centrally disposed crowned portion 150 having an opening 152. Extending vertically through this opening 152 are a hollow outer shaft 200 and an inner shaft 236 rotatably mounted within the hollow outer shaft 200. In this instance, the inner shaft 236 is for driving a washing element or agitator and the outer shaft 200 is for driving or spinning an inner tub for discharging water therefrom and extracting liquid from fabrics therein, as fully described in the parent application. The inner and outer shafts and the mechanism carried thereby including the inner tub are ultimately supported by an arched cross-frame base member 117.

More specifically the hollow outer shaft 200 terminates in a restricted end portion 202 which provides a shoulder 204 mounted upon a radial and thrust bearing 206 which is supported by the arched supporting member 117 of the base structure. The radial and thrust bearing 206 comprises an inner race ring 208 which engages shoulder 204 of the hollow shaft 200 and an outer race ring 210 which is supported upon a dish-shaped member 212 substantially Z-shaped in cross-section; the lower inwardly extending annular flange 214 thereof engaging the outer race ring 210 and the upper outwardly extending annular flange 216 of which engages and is flexibly supported by the annular resilient bushing 218. The resilient bushing 218, which may be of rubber or the like, is supported by the annular dish-shaped retaining member 220 which extends downwardly through opening 119 of the channel shaped member 117. The member 220 is provided with a lower inwardly disposed annular flange 222 upon which the bushing 218 is mounted and an upper outwardly extending annular flange 224 which overlaps the central web of the channel shaped member 117 and is rigidly secured thereto in any desired manner. In this way the shafts and associated parts are all flexibly and solely supported at a point near the lower end of the outer shaft 200. Disposed within the hollow shaft 200 is the inner drive shaft 236 journaled in the outer shaft through bearing including a lower bearing 240 which align the inner shaft with respect to the hollow shaft and permit the inner shaft to rotate relative thereto. The drive shaft 236 is rotated for rotating the inner tub by means of a suitable motor through a belt 296 which passes around and is received within the V-shaped groove 298 of the drive pulley 300.

In the washing machine disclosed in the parent application where provision is made for spinning or rotating the inner tub for extracting washing liquid from the material contained therein, the starting torque required of the motor is much greater than the torque which is required at operating speeds. From an economical standpoint a motor of relatively low rated capacity is desirable and one which will bring the inner tub up to operating speeds within a reasonable length of time. Inasmuch as the delivered torque of such a motor is less than the starting torque for rotating the inner tub, it is desirable to provide a clutch mechanism adapted to slip during the time when the motor is bringing the inner tub up to operating speed, but in which no slipping is required after the operating speed of the inner tub is reached.

The constant torque limiting clutch which forms the subject matter of a copending application filed in the name of Thomas R. Smith on the 27th day of October, 1948, and bearing Serial No. 56,845, now Patent No. 2,604,764, issued July 21, 1952, comprises the pulley 300 which is driven by the belt 296 and which will transmit torque to the inner shaft 236 until the load on said shaft exceeds the maximum torque for which the clutch is designed. The pulley 300 is provided with a hub 316 having a bearing or bushing 318 mounted therein which is rotatably mounted on a hub 324 of the driven member 322. This pulley is formed with the downwardly extending and integral cylindrical wall 320 provided with an inner face forming a friction driving surface for the slip clutch. The driven member of the clutch is constituted by a clutch drum 322 having the hub 324 thereof splined, as at 326, to the lower end of the shaft 236, the drum being held in operative position on the shaft 236 by the spring retaining ring 328. As will be noted, the clutch drum 322 has a washer 329 embracing the central hub 324 thereof upon which the hub 316 and its bushing 318 are mounted for positioning the pulley 300 with respect to the driven member. The clutch drum 322 is provided with an intergrally formed upstanding wall 330 disposed inwardly of and in spaced relation to the cylindrical wall 320 of the pulley 300, the said wall having an opening 332 provided therein. Disposed between the cylindrical walls 320 and 330 and supported upon the annular flange 334 of the drum is disposed a clutch band 336 to which is secured a clutch band lining 338 adapted to frictionally engage the inner surface of the cylindrical wall 320. Mounted upon the clutch drum 322 is a curved control spring 340 provided with radially extending ends which extend through the opening 332 and are connected to the ends of the clutch band 336. As will be apparent, the spring 340 acts to expand the clutch band 336 whereby the clutch band lining 338 is moved into driving relation with the inner surface of the wall 320. All of the driving torque from the pulley 300 is transmitted by friction through the clutch band lining to the clutch band 336 and then to the clutch drum 322 through the spring 340 which has its ends 342 and 344 connected thereto.

As the pulley 300 is rotated, the friction between the inner face of the wall 320 and the clutch band lining 338 causes the clutch band 336 which carries the control spring 340 to rotate a short distance until one end of the control spring contacts one edge of the wall 330 defining the opening 332, the edge of the wall 330 engaged by the control spring depending, of course, upon the direction of rotation of the pulley 300. The clutch drum 322 is then caused to rotate and drives the shaft 236. When the torque required to rotate the shaft 236 exceeds the loading of the spring 340 slippage occurs between the pulley 300 and the clutch drum 322. This slippage occurs until such time as the torque required to rotate the shaft 236 is equal to or less than the torque being transmitted between the pulley 300 and the clutch drum 322 through the lining 338. This clutch construction provides for the delivery of constant torque to the shaft 236 which cannot be exceeded, whereby the shaft 236 can be brought gradually up to speed for the spinning operation without causing damage to the motor because of excessive loads during the starting period. After the inner tub or other load has been brought up to speed, the torque required to maintain this speed is less than the rated capacity of the motor and, accordingly, no slippage takes place between the pulley 300 and the clutch drum 322.

As will be apparent from the above description, the combined radial and thrust bearing 206 mounted on the reduced portion 202 of the outer shaft 200 and engaging the annular shoulder 204 thereof not only supports the super-structure including the associated mechanisms but also provides a support for the inner shaft 236 as disclosed in the parent application and, accordingly, such radial and thrust bearing positions and supports the pulley 300 and the constant torque slip clutch immediately above described which effects a driving connection between said pulley 300 and the shaft 236.

As particularly referred to in the parent application, the present invention in one of its uses contemplates a structure in which material within a washing tub is subjected to a washing operation through the action of an agitator and also subjected to a centrifuging action whereby the said material is spin dried upon rotation of the tub. In order to rapidly rotate the inner tub suitable clutch mechanism is provided for effecting a driving relation between the inner shaft 236 and the outer shaft 200. In the illustrative embodiment of the invention such clutch mechanism takes the form of a spring clutch including an expanding type tapered spring clutch element 346 embracing the shaft 236 and being disposed within the enlarged hollow portion 348 of the outer hollow shaft 200. The lower end of the spring clutch element 346 is operatively connected to the shaft 236 and a pin 350 is provided to prevent axial movement of the spring. The upper actuating end of the spring clutch element is arranged to be engaged by a key 352 mounted within the clutch collar 354. During the period when the agitator is being operated, the clutch collar 354 is held in an elevated position by means of bell crank lever 356 whereby the key 352 is disengaged from the upper operating end of the spring clutch element 346. When the bell crank lever 356 is tripped, the clutch collar 354 moves downwardly under the action of gravity to position the key 352 in the path of movement of the upper operating end of spring clutch element 346 whereby the said spring clutch element is expanded to frictionally engage the wall of enlarged recess 348 of the outer hollow shaft 200 at which time a driving connection is effected between the shafts 200 and 236 to rapidly rotate the inner tub.

The bell crank lever 356 is pivoted, as at 358, to a bracket 360 connected by means of screws or rivets 362, or the like, to a hollow sleeve 370 constituting a part of a damper mechanism 234 to which is secured a brake shoe support 364 forming an element of brake mechanism 365, to be hereinafter more fully described.

Figure 5:
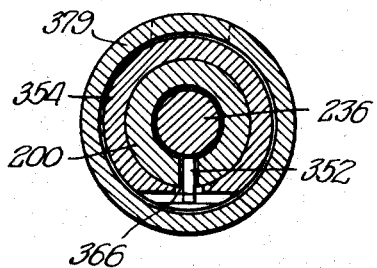
Figure 5 is a horizontal cross-sectional view taken in the plane represented by line 5—5 of Figure 4 of the drawings.
Figure 6:
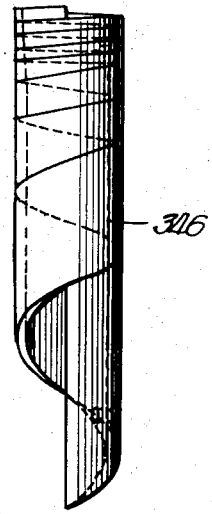
Figure 6 is a view in elevation of the spring clutch element for the driving mechanism more particularly shown in Figure 1 of the drawings.

The clutch mechanism requires a minimum of space in the device and the assembly for the clutch operating means is such as to permit the same to be rapidly and easily assembled and disassembled. As disclosed more particularly in Figures 1, 4 and 5 of the drawings, the key 352 is of T-formation and has its operating shank or extension movably mounted within the key-hole slot 366, the said key being restrained from turning movement within the lower part of the slot 366, but the opening 368 at the upper end is of such size as to permit the key 352 to be turned at 90° to its normal operating position. The clutch collar 354 is provided with an opening 370 having a lateral dimension adapted to permit radial movement of the extensions 378 of the key 352 with respect to the collar 354 when the shank or extension thereof is disposed within the opening 368 at 90° to its normal operative position. The opening 370 is defined at its upper and lower edges by the under-cut grooves 372 and 374 which are adapted to receive the extensions 378, respectively, of the key to prevent lateral radial movement of the key 352 with respect to the shaft 200. It is therefore apparent that when the opening 370 is aligned with the opening 368 the key 352 may be disposed at 90° from its normal operative position and either removed from or inserted into its engaging relation with the clutch collar 354. As will be noted, the damper mechanism 234 is provided with a hollow sleeve 379 which surrounds and embraces the outer shaft 200 and has the journal bearings 384 and 386 mounted co-axially with and journaled on the hollow shaft 200 and providing an annular space therebetween within which the collar 354 is axially movable. This hollow sleeve 379 is provided with an opening 380 which may be aligned with the openings 368 and 370 whereby the key 352 may be readily inserted into or removed from its assembled position with respect to the collar 354. Threadedly mounted in the hollow sleeve 379 is a screw 382 projecting inwardly into the path of movement of the clutch collar 354 to prevent upward movement thereof to such an extent that the shank of the key 352 enters the opening 368, but which may be withdrawn sufficiently to permit the collar 354 to be moved upwardly a sufficient amount to bring the openings 368, 370 and 380 into alignment when it is desired to insert or remove the key 352.

The hollow sleeve 379 is formed with an outwardly extending spherical shaped wall 388, reinforced by the oppositely disposed webs 390, and to the upper surface of which friction material 394 is connected in any suitable manner which frictionally engages or mates with a complementary spherical surface formed on the under side of the central crowned portion 150 of the outer tub 6.

The brake shoe support 364, heretofore referred to generally, is formed with a hub 396 mounted on the lower end of the hollow sleeve 379, the said support being connected by a plurality of bolts 398 in fixed relation to said hollow sleeve. The webs 390, of which four are shown in the present embodiment are each provided at their lower end with an aperture 400 engaged by the end of a coil spring 402. Each of these springs extends at an angle to the vertical axis of the sleeve 379 and has its opposite end preferably rigidly secured to the bottom wall 146 of the outer tub 6. Due to the angular disposition of the springs 402 with respect to the vertical axis of the sleeve 379 and their connection to the brake shoe support 364 and the tub 6, a component of the spring force is applied in a vertical direction to the friction material 394. It is also apparent that inasmuch as the springs 402 are equally loaded and the springs of each pair are disposed in opposite relation to one another, the spring forces acting through the hollow sleeve 379 will tend to return the tub to its neutral or vertical position where the spring forces are all equal or opposite should said tub tend to move away from its normal vertical position. It is further apparent that the friction material 394 is forced by the springs into effective frictional engagement with the spherical under-surface of the bottom wall 146 of the outer tub and that as the receptacle tends to move in a horizontal plane a certain portion of the energy tending to move the receptacle is absorbed by the friction material. The friction material, therefore, tends to reduce the amplitude or extent of horizontal movement of the inner tub and absorbs some of the energy applied thereto when the said tub wobbles or moves laterally under eccentric loadings within the tub during a spinning operation.

When the shaft 236 is rotated, as for example, freely to oscillate the agitator, at which time the key 352 is disengaged from the spring clutch element 346, the outer shaft 200 and the tub assembly connected thereto is held against rotation by the friction brake 365. As previously indicated, this friction brake mechanism incorporates the brake shoe support 364 having the brake shoes 406 and 408 pivoted thereto as at 410 and 412, respectively, the said brake shoes being provided with a brake lining, such as 414, engageable with the inner cylindrical surface of the brake drum 416 having a hub 418 splined to the outer hollow shaft 200 and which has its lower end in abutting relation with the inner race ring 208 whereby the same is supported and held in operative position. The brake shoes 406 and 408 at their opposite ends are pivotally connected, respectively, through the links 420 and 422 to the crank collar 424 secured to the lower end of a pin 426 mounted in the brake shoe support 364. An operating arm 428 is connected to the upper end of the pin 426 whereby the brake shoes, which are normally in engagement with the brake drum 416, may be moved inwardly and out of such engagement when the outer shaft 200 is driven by the inner shaft 236 through the spring clutch element 346. A coil spring 430 is interposed between the brake shoes 406 and 408 which normally maintains said brake shoes in frictional engagement with the brake shoe drum 416. The outer end of the operating arm 428 is connected through a link 432 to a solenoid 434 connected to a suitable control circuit. In this instance it is a control circuit for operating the brake during a washing cycle. The solenoid 434 is normally deenergized while the agitator is operated during which time the spring 430 maintains the brake shoes 406 and 408 in frictional engagement with the brake shoe drum to maintain the outer sleeve 200 and the tub and its associated mechanisms stationary. Mounted on the brake shoe support 364 is a stop element 436 for limiting the outward movement of arm 428. The arm 428 is provided with a projection 438 engageable with one leg of the bell crank lever 356 for moving the bell crank lever about its pivot point 358 to maintain the clutch collar 354 in a position whereby the key 352 is disengaged from the operating end of the spring clutch element 346. In order to hold the bell crank lever 356 in a position to render the spring clutch mechanism inoperative, the arm 428 has a coil spring 440 connected thereto which is anchored at its other end in the base structure. Upon energization of the solenoid 434, the arm 428 is moved thereby in a clockwise direction, as viewed in Figure 7 of the drawings, to move the projection 428 thereof out of engagement with the bell crank lever 356 thus permitting the bell crank lever 356 to swing about its pivot point and to allow the clutch collar 354 to move downwardly with respect to the shaft 200 whereby the key 352 engages the spring clutch element 346 to effect a driving connection between shafts 236 and 200. The brake mechanism 365 is held against torsional movement when the brake is applied in any suitable manner.

From the above description, it is clear that there are two concentric shafts 236 and 200, the inner one 236 of which may be driven independently of the outer shaft 200 for driving any suitable mechanism, such as a washing agitator as disclosed in the parent application. Under such circumstances the inner shaft 236 is not operatively connected to the outer hollow shaft 200 because the clutch collar 354 is held in an elevated position whereby the key 352 is disengaged from the upper operating end of the spring clutch element 346. At the same time the outer hollow shaft 200 is held against rotation by the brake mechanism 365. However, if it is desired to rotate the outer hollow shaft 200 for driving any suitable mechanism, such as a tub for spinning as disclosed in the parent application, the braking action of the brake mechanism 365 is released as described, and when the bell crank lever 356 is tripped, the clutch collar 354 moves downwardly under the action of gravity to position the key 352 in the path of movement of the upper operating end of the spring clutch element 346 whereby the latter is expanded to frictionally engage the wall of the enlarged recess 348 of the outer hollow shaft 200 at which time a driving connection is effected between the shafts 236 and 200 to rapidly rotate the outer shaft and any element it is to drive. When it is desired to discontinue the driving connection between the two shafts 236 and 200, the key 352 is caused to move up out of engagement with the upper active end of spring clutch element 346 and the brake mechanism 365 again made effective as described.

There may be various modifications of the invention and it is my intention to cover all such modifications coming within the spirit and scope of the following claims.

I claim:

1. An actuator for a clutch element, comprising inner and outer concentric shafts, a spring clutch element having a free end disposed between said shafts and adapted to effect the driving connection between the same, said outer shaft having a keyhole slot extending therethrough adjacent the free end of said clutch element, a clutch collar mounted for axial movement with respect to said free end and provided with an opening therethrough with oppositely disposed recesses, a key movable into the path of movement of said free end of said spring clutch element projecting through said opening and having oppositely disposed parts engageable in said recesses, said recesses being so disposed and arranged as to permit rotation of said key within the enlarged portion of said keyhole slot whereby the same may be inserted into and removed from its operative association with said collar, and means for moving said key away from the free end of said spring clutch element.

2. An actuator for a clutch element, comprising inner and outer concentric shafts, a spring clutch element having a free end disposed between said shafts and adapted to effect the driving connection between the same, said outer shaft having a keyhole slot extending therethrough adjacent the free end of said clutch element, an outer hollow member concentric with and in spaced relation to said outer shaft, a clutch collar mounted for axial movement with respect to and between said outer shaft and said hollow member and being provided with an opening therethrough having oppositely disposed recesses, a T-shaped key having a portion projecting through said opening and movable in said keyhole slot by said clutch collar into and out of engagement with the free end of said spring clutch element and having another portion mounted in said recesses, and stop means normally limiting movement of said key to prevent the same entering the enlarged portion of said keyhole slot, said hollow member being provided with an opening adapted to be disposed in alignment with the enlarged portion of said keyhole slot, said recesses being so disposed and arranged as to permit rotation of said key within the enlarged portion of said slot whereby the same may be inserted into and removed from its operative association with said collar through said opening in said hollow member.

3. An actuator for a clutch element, comprising inner and outer concentric vertical shafts, a spring clutch element having a free end disposed between said shafts and adapted to effect the driving connection between the same, said outer shaft having a keyhole slot extending therethrough adjacent the free end of said clutch element, an outer hollow member concentric with and in spaced relation to said vertical outer shaft and having an opening therein, a gravity responsive clutch collar mounted for axial movement with respect to and between said outer shaft and said hollow member and being provided with an opening therethrough between oppositely disposed recesses, a T-shaped key having a portion projecting through said last mentioned opening and vertically movable in said key-hole slot into and out of engagement with the free end of said spring clutch element upon movement of said clutch collar and having its crossed portion mounted in said recesses, said recesses being so disposed and arranged as to permit rotation of said key within the enlarged portion of said keyhole slot whereby the same may be inserted and removed from its operative association with said collar through the opening in said hollow member, stop means carried by said hollow member normally limiting the vertical upward movement of said key to prevent the same entering the enlarged portion of said key-hole slot, and means carried by said hollow member and acting on said gravity responsive collar for elevating said key vertically away from the free end of said spring clutch element.

4. An actuator for a clutch element, comprising inner and outer concentric shafts, a spring clutch element having a free end disposed between said shafts and adapted to effect the driving connection between the same, said outer shaft having a keyhole slot extending therethrough adjacent the free end of said clutch element, a clutch collar mounted for axial movement with respect to said free end and provided with an opening therethrough between oppositely disposed recesses, and a removable key having oppositely disposed parts engageable in said recesses and a projecting portion extending through the slot in said outer shaft for engaging the free end of said clutch spring upon movement of said collar in one direction, said key being rotatable to remove said projecting portions from said recesses whereby the same may be inserted into and removed from its operative association with said collar.

5. An actuator for a clutch element, comprising inner and outer concentric shafts, a spring clutch element having a free end disposed between said shafts and adapted to effect the driving connection between the same, said outer shaft having a keyhole slot extending therethrough adjacent the free end of said clutch element, a clutch collar mounted for axial movement with respect to said free end and provided with a recess, and a removable key having a projecting portion engageable in said recess and another projecting portion extending through the slot in said outer shaft for engaging the free end of said spring clutch element upon movement of said collar in one direction, said key being rotatable with respect to said collar to remove said first mentioned projecting portion from said recess whereby the same may be inserted and removed from its operative association with said collar.

6. A clutch actuator comprising relatively rotatable inner and outer vertical concentric shafts, a spring clutch element disposed between said shafts, said spring clutch having its lower end secured to said inner shaft and an upper free end adapted to effect a driving connection between said shafts, said outer shaft having a slot extending therethrough adjacent the free end of said spring clutch element, a gravity responsive concentric collar loosely surrounding said outer shaft, a key carried by said collar aand projecting through said slot for engaging said free end to energize said clutch element, a movable abutment for elevating said collar and key vertically against the force of gravity out of engagement with the free end of said clutch element, and means for actuating said movable abutment to permit said gravity responsive collar and key to move downwardly solely under the influence of gravity into engagement with the free end of said spring clutch element to expand the same into engagement with said outer shaft.

THOMAS R. SMITH.

References Cited in the file of this patent

UNITED STATES PATENTS

| Number | Name | Date |
|---|---|---|
| 1,704,062 | Starkey | Mar. 5, 1929 |
| 1,714,496 | Chilton | May 28, 1929 |
| 2,235,266 | Starkey | Mar. 18, 1941 |
| 2,257,987 | Starkey | Oct. 7, 1941 |
| 2,270,507 | Clark | Jan. 20, 1942 |
| 2,273,334 | Shakespeare | Feb. 17, 1942 |
| 2,446,064 | Smith | July 27, 1948 |
| 2,548,732 | Lippold | Apr. 10, 1951 |